United States Patent [19]

Otsuki

[11] Patent Number: 5,029,080
[45] Date of Patent: Jul. 2, 1991

[54] METHOD AND APPARATUS FOR COMPOSING A SET OF INSTRUCTIONS FOR EXECUTING A DATA FLOW PROGRAM DEFINED BY STRUCTURED DATA

[75] Inventor: Shigeru Otsuki, Yokohama, Japan
[73] Assignee: Hitachi, Ltd., Tokyo, Japan
[21] Appl. No.: 181,586
[22] Filed: Apr. 14, 1988

[30] Foreign Application Priority Data

Apr. 17, 1987 [JP] Japan .................. 62-94580

[51] Int. Cl.$^5$ ............................................. G06F 15/82
[52] U.S. Cl. .......................... 364/200; 364/232.22; 364/230.3; 364/254.6; 364/261.2
[58] Field of Search ... 364/200 MS File, 900 MS File, 364/300, 736

[56] References Cited

U.S. PATENT DOCUMENTS

| | | | |
|---|---|---|---|
| 3,962,706 | 6/1976 | Dennis et al. | 364/900 |
| 4,145,733 | 3/1979 | Misunas et al. | 364/200 |
| 4,149,240 | 4/1979 | Misunas et al. | 364/200 |
| 4,315,315 | 2/1982 | Kossiakoff | 364/300 |
| 4,319,321 | 3/1982 | Anastas et al. | 364/200 |
| 4,455,619 | 6/1984 | Masni et al. | 364/900 |
| 4,644,461 | 2/1987 | Jennings | 364/200 |
| 4,814,978 | 3/1989 | Dennis | 364/200 |
| 4,866,663 | 9/1989 | Griffin | 364/900 |

*Primary Examiner*—Thomas C. Lee
*Attorney, Agent, or Firm*—Antonelli, Terry, Stout & Kraus

[57] ABSTRACT

A method of composing a set of instructions for directly executing a data-flow type program by using a Petri net diagram direction to structured data of at least one of, or a combination of, Cartesian product, direct union and sequence, and a structured data driven type processor system for executing a program containing such instructions. In composing a set of instructions, desired data paths, i.e., links, are provided in accordance with the Petri net diagram, and the links are defined by a data type which defines the data to be processed. A work node connected to the link at the input side of the work node is defined which work node takes data from the link at the input side of the work node, performs a desired calculation to take the calculation result out to the link at the output side of the work node. A data type defining data on the link at the output side is restricted by a calculation function of the work node. Instructions associated with data structure include a decomposition instruction for decomposing structured data into constituent elements and a composition instruction for composing data of Cartesian product, direct union or sequence from constituents elements. The decomposition and composition instructions are added to instruction languages of the structured data driven type system.

3 Claims, 20 Drawing Sheets

FIG. 2A PETRI NET DIAGRAM

LINK NODE L: ◯
(I.E., PLACE)

WORK NODE W: [op]
(I.E., TRANSITION)

F I G. 3A
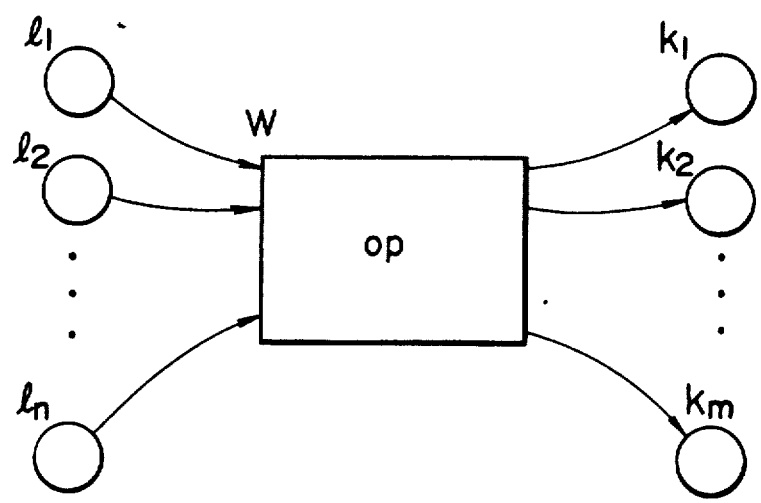
F I G. 3B
$$W : op / \ell_1, \ell_2, \cdots \ell_n - k_1, k_2, \cdots, k_m$$

FIG. 4

| | | | | |
|---|---|---|---|---|
| $W_1$ | : DUP / | $l_1$ | → | $l_4, l_5$ |
| $W_2$ | : DUP / | $l_2$ | → | $l_6, l_7$ |
| $W_3$ | : * / | $l_6, l_3$ | → | $l_8$ |
| $W_4$ | : ↑ / | $l_5, 2$ | → | $l_9$ |
| $W_5$ | : * / | $4, l_8$ | → | $l_{10}$ |
| $W_6$ | : − / | $l_9, l_{10}$ | → | $l_{11}$ |
| $W_7$ | : NEG / | $l_4$ | → | $l_{12}$ |
| $W_8$ | : SQRT / | $l_{11}$ | → | $l_{13}$ |
| $W_9$ | : * / | $2, l_7$ | → | $l_{14}$ |
| $W_{10}$ | : DUP / | $l_{12}$ | → | $l_{15}, l_{16}$ |
| $W_{11}$ | : DUP / | $l_{13}$ | → | $l_{17}, l_{18}$ |
| $W_{12}$ | : + / | $l_{15}, l_{17}$ | → | $l_{19}$ |
| $W_{13}$ | : − / | $l_{16}, l_{18}$ | → | $l_{20}$ |
| $W_{14}$ | : DUP / | $l_{14}$ | → | $l_{21}, l_{22}$ |
| $W_{15}$ | : ÷ / | $l_{19}, l_{21}$ | → | $l_{23}$ |
| $W_{16}$ | : ÷ / | $l_{20}, l_{22}$ | → | $l_{24}$ |

F I G. 6
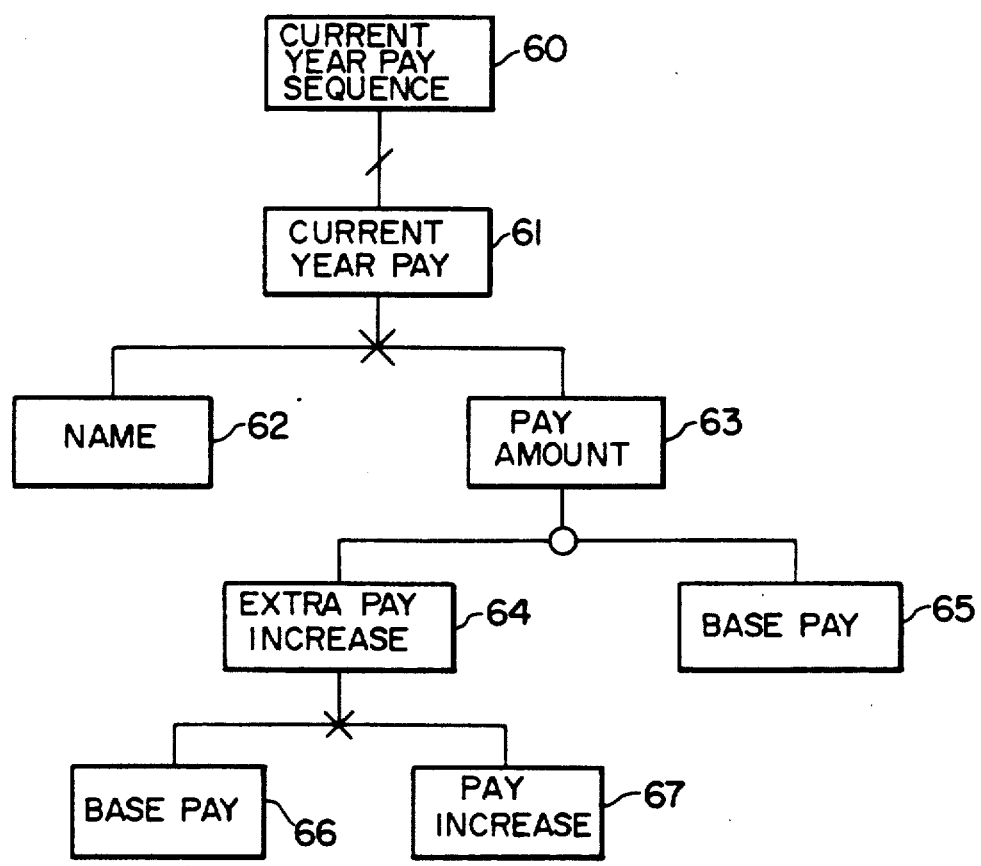

CARTESIAN PRODUCT DECOMPOSITION

CARTESIAN PRODUCT COMPOSITION

DIRECT UNION DECOMPOSITION

DIRECT UNION COMPOSITION

SEQUENCE DECOMPOSITION

SEQUENCE COMPOSITION

FIG. 10A

$W : PD / L \rightarrow L_1, L_2, \cdots, L_n$

FIG. 10B

$W : PC / L_1, L_2, \cdots, L_n \rightarrow L$

FIG. 10C

$W_1 : UD / L \rightarrow L_1$
$W_2 : UD / L \rightarrow L_2$
$\vdots$
$W_n : UD / L \rightarrow L_n$

FIG. 10D

$W_1 : UC / L_1 \rightarrow L$
$W_2 : UC / L_2 \rightarrow L$
$\vdots$
$W_n : UC / L_n \rightarrow L$

FIG. 10E

$W : SD / L \rightarrow L_1$

FIG. 10F

$W : SC / L_1 \rightarrow L$

FIG. 12A

INSTRUCTION PACKET 1201

| INSTRUC-TION CODE | INPUT LINK 1 | INPUT LINK 2 | OUTPUT LINK 1 | OUTPUT LINK 2 |
|---|---|---|---|---|

FIG. 12B

INSTRUCTION BUFFER

| CELL | CODE | INPUT LINK | | OUTPUT LINK | |
|---|---|---|---|---|---|
| 1 | SD | $l_1$ | | $l_2$ | |
| 2 | PD | $l_2$ | | $l_3$ | $l_4$ |
| 3 | UD | $l_4$ | | $l_5$ | |
| 4 | UD | $l_4$ | | $l_6$ | |
| 5 | * | 1.1 | $l_5$ | $l_9$ | |
| 6 | PD | $l_6$ | | $l_7$ | $l_8$ |
| 7 | + | $l_7$ | $l_8$ | $l_9$ | |
| 8 | PC | $l_3$ | $l_9$ | $l_{10}$ | |
| 9 | SC | $l_{10}$ | | $l_{11}$ | |
| 10 | | | | | |

INSTANCE CELL

DATA STRUCTURE

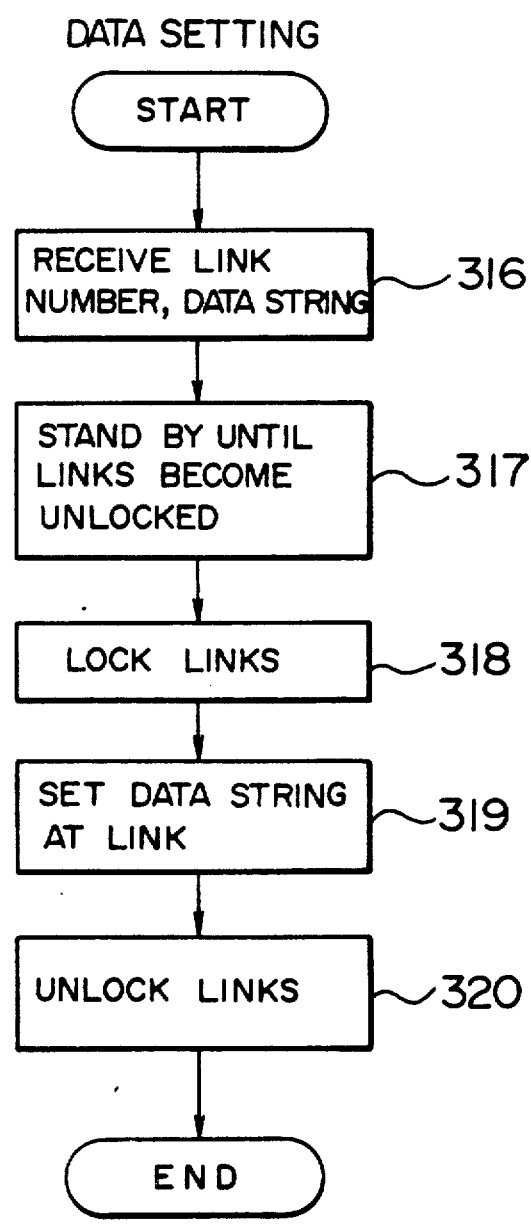

METHOD AND APPARATUS FOR COMPOSING A SET OF INSTRUCTIONS FOR EXECUTING A DATA FLOW PROGRAM DEFINED BY STRUCTURED DATA

BACKGROUND OF THE INVENTION

The present invention relates to a method of composing a set of instructions for executing a data-flow program which processes structured data including records, unions and lists, and to a structured data driven type processor system suitable for directly handling data-flow type software specifications.

As discussed, for example, in "Iwanami Lectures On Microelectronics 8 VLSI Computer I", Dec. 10, 1984, pp. 70 to 75, and its source paper, Dennis, J.B. et al "A Preliminary Architecture for a Basic Data-Flow Processor", Proc. of 2nd Annual Int. Symp. on Computer Architecture, 1975, pp. 126 to 132, a conventional structured data driven type processor system is allowed to be programmable and has a high performance in its parallel operations, although operand data of an instruction are limited to simple numerical values.

The above conventional technique concerns data-flow processing only for primitive data such as integers and bit string, and does not consider processing structured data. In order to process such structured data, it is necessary to decompose the structured data into basic or element data such as integers or real numbers. It takes therefore a lot of time (labor) in programming and there arises a problem of poor readability of the program.

SUMMARY OF THE INVENTION

It is an object of the present invention to provide a method of composing at a high abstraction language level a set of instructions for executing a data-flow type program directed to structured flowing data, while achieving a high performance of parallel processings of the instructions.

It is another object of the present invention to provide a structured data processor system for executing instructions composed as above.

According to one aspect of the present invention, a method of composing a set of instructions for directly executing a data-flow program by using a Petri net diagram includes the steps of: providing desired data paths in accordance with a Petri net diagram, defining the paths by a data type which defines the structure of data as being at least one of, or a combination of, Cartesian product, direct union and sequence or defines a combination of structured data and non-structured data; and defining a work node (for changing the data structure) which takes data from each data path, calculates the data in accordance with a function defined by the diagram, and takes the processed result out to each data path at the output of the work node, whereby a data type defining data on each data path at the output is restricted by the function of the work node. As one example of interpreting Petri net for programming languages, the present invention provides a rule or meaning by which structured data of records, unions and lists can be handled. Namely, data having a data type of Cartesian product, direct union and sequence are directly coupled to a data path or link corresponding to a "place" in the Petri net model diagram. Therefore, it becomes possible to compose a set of instructions capable of directly executing a data-flow type program while structured data to be processed are flowing. The Petri net model is detailed in Robert E. Filman & Daniel P. Friedman "Coordinated Computing: Tools and Techniques for Distributed Software" 1984, Mc-Graw Hill, and the structured data programming method is detailed in Q. J. Dahl, E. W. Dijkstra, and C. A. R. Hoare "Structured Programming" Academic Press, 1972. The descriptions contained therein are incorporated in the present disclosure by way of reference.

According to another aspect of the present invention, in a structured data (driven type) processor system which has an instruction buffer for holding instructions in executing a data-flow program and an execution control function for judging if taken instructions are executable or not and sending instructions to a plurality of processors, and can execute in parallel those instructions having a complete set of operand data by coupling them to the plurality of processors, the instruction buffer receives the instruction languages of the structured data driven type processor system which languages additionally include a decomposition instruction and a composition insturction. The decomposition instruction is used for decomposing data of a Cartesian product, direct union or sequence structure into constituent elements. The composition instruction is used for composing the constituent elements into data of a Cartesian product, direct union or sequence structure. The total instruction execution performance can be improved by parallel operations of the plurality of processors using the composition and decomposition instructions.

Instructions associated with structured data include a decomposition instruction whereby structured data is used as an input operand, and decomposed into constituent elements which in turn is used as output operands, and a composition instruction whereby constituent elements are used as input operands, and composed into structured data which in turn is used as an output operand. As a result, structured data can be used for the calculation (arithmetic operation) without converting structured data into non-structured basic data as in conventional technique. The operands of the composition and decomposition instructions are described in the format designating a link on which data are present. Such link information is all stored in a link buffer to perform an exclusive control thereof by a link controller, to enable efficient parallel operation.

BRIEF DESCRIPTION OF THE DRAWINGS

FIGS. 2A and 2B show an example of data-flow of non-structured data;

FIGS. 3A and 3B shows an example of a rule for converting a data-flow diagram into a program;

FIG. 4 shows an example of a data-flow program;

FIG. 6 shows a specific data structure;

FIGS. 10A to 10F show operations of structured data expressed in the form of texts;

FIGS. 12A and 12B illustrate an example of an instruction format and an example of a data-flow program handling structured data;

FIGS. 17A to 17C are flow charts illustrating processes executed by a link buffer controller.

DESCRIPTION OF THE PREFERRED EMBODIMENTS

Embodiments of the present invention will be described in detail with reference to the accompanying drawings. In the embodiments to be described hereinbelow, objective data-flow is described in a bi-parted graph which interconnects work nodes and link nodes alternately by arrows.

A program used for data-flow is a set of instructions, each having an instruction code defined to a work node, and operands present on link nodes at the input and output of the work node. In executing a program, executable instructions among a set of instructions are caused to be executed in parallel. The executable instruction herein used means an instruction which has all the data of a link node or nodes at the input of a work node concern. The instruction execution herein used means an operation wherein data is taken from each input link to perform an operation for conversion defined by the instruction code, and the resultant data is taken out to each output link.

Figure 2B:
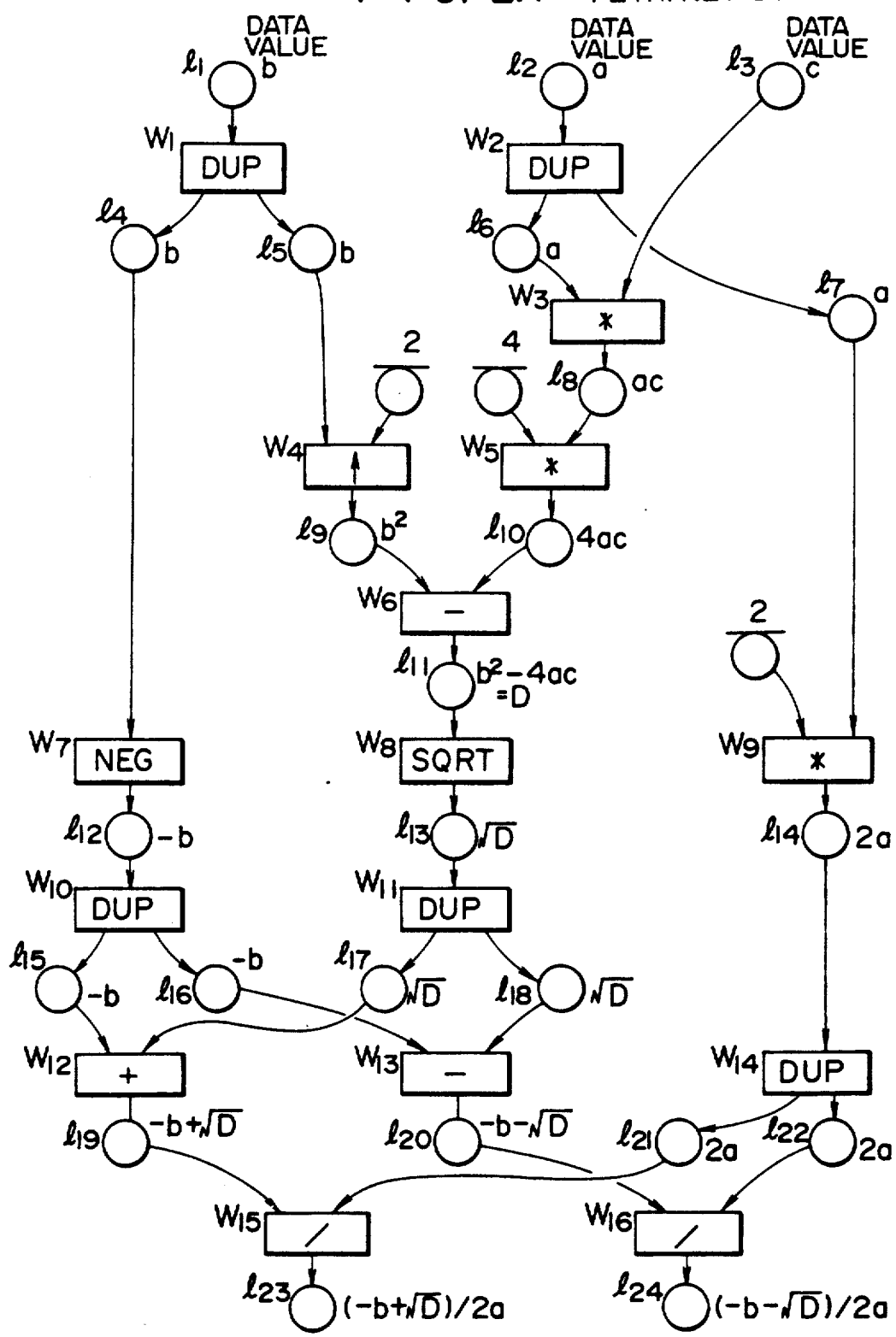

Data-flow will be described taking a problem of solving roots of a quadratic equation by way of example. FIG. 2A shows a data-flow for solving roots of a quadratic equation. Input data include a coefficient a of the second-order term, a coefficient b of the first-order term and a constant term c, and the calculation result is two roots. The diagram is described using the notation as shown in FIG. 2B, wherein rectangles representing work nodes and circles representing link nodes are alternately connected by arrows to form a bi-parted graph. Work nodes are labeled W1 to W16 with an instruction code depicted within a rectangle. Link nodes are labeled 11 to 124. A link node circle having a tangent line is called a constant link and always provides a constant value specific to the link node. For the convenience of description, a character or characters are affixed at the side of a link node circle, which characters represent a data value calculated from the starting inputs of a, b and c.

Of instruction codes OP, "+" represents addition, "−" subtraction, "*" multiplication, "/" division, "↑" power, "NEG" sign inversion, "SQRT" square root, and "DUP" duplication. For example, by the instruction code DUP at the work node W1, data is taken from the input side link 11 and the same data is put to both the output side links 14 and 15. By the instruction code at the work node W4, data is taken from the link 15 as a first operand while data is taken from the constant link supplying a value 2 as a second operand, and the power of 2 of the first operand is calculated to put it to the output side link 19. Similar operations are performed by other work nodes.

A rule of converting a data-flow into a program is shown in FIGS. 3A and 3B. FIG. 3A shows a general data-flow diagram of each work node, wherein W represents a label of the work node, OP an instruction code, 11 to ln labels of input side link nodes, and k1 to km labels of output side link nodes. A program instruction corresponding to the above data-flow diagram is expressed as in FIG. 3B. FIG. 4 shows a set of program instructions converted from the data-flow diagram shown in FIG. 2A in accordance with the rule.

Executable instructions are those having all the data of input operands as described previously. In a case of a program shown in FIG. 4, first data a, b and c are put to links 11, 12 and 13, respectively as their initial value (refer to FIG. 2A). At this initial state executable instructions are those at W1 and W2. After completion of executing the two instructions, the data on the link 11 and 12 disappear and they are put to links (4, 15, 16 and 17. At this state, executable instructions are those at W3, W4, W7 and W9. Similarly, executable instructions are caused to be executed sequentially or in parallel to repeat calculation operations in the following procedure until it becomes a state where there is no executable instruction. In the present embodiment, the execution continues until data is put to the links 123 and 124.

Figure 5A:
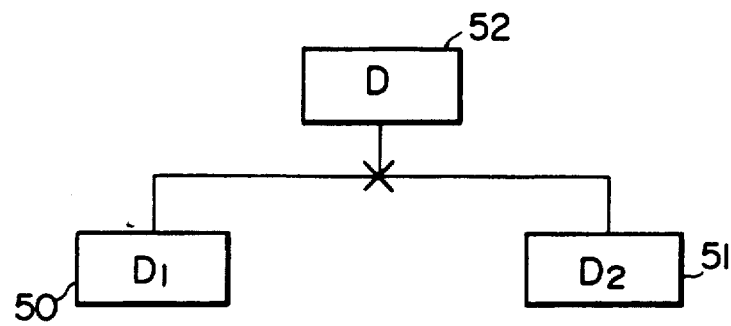
FIGS. 5A, 5B and 5C show data structures.
Figure 5B:
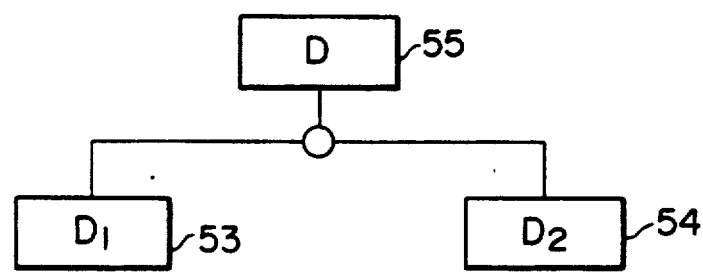
Figure 5C:
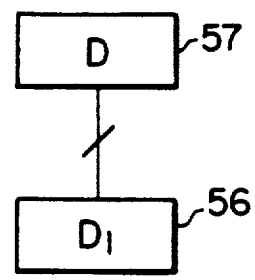

The data structure includes three basic structures, i.e., Cartesian product, direct union and sequence structures. It is assumed that sets of data are D1 and D2, 50 and 51 respectively of data D 52. Then, a set of Cartesian data of D1 and D2 is a set of elements each element being a pair of D1 50 element and D2 51 element, and is expressed as shown in FIG. 5A. A set of direol union data of D1 and D2 53 and 54 respectively of data D 55 is a set of elements each element being D1 53 element or D2 54 element, and is expressed as shown in FIG. 5B. A set of sequence data of D1 56 of data 57 is a set of elements each element having no D1 element or D1 elements more than 1, and is expressed as shown in FIG. 5C.

An optional combination of these basic structures is used to form a data structure. FIG. 6 shows a particular example of a combined data structure. A set of data "Current Year Pay Sequence" 60 is constructed of a list of "Current Year Pay" 61. "Current Year Pay" 61 is a Cartesian product of "Name" 62 and "Pay Amount" 63. "Pay Amount" 63 is a direct union of "Extra Pay Increase" and "Base Pay" 65. "Extra Pay Increase" 64 is a Cartesian product of "Base Pay" 66 and "Pay Increase" 65.

The above data structures are coupled to links in the data-flow. Namely, the data structures are always associated with the links. A series of instructions are defined to the data structures.

Figure 7A:
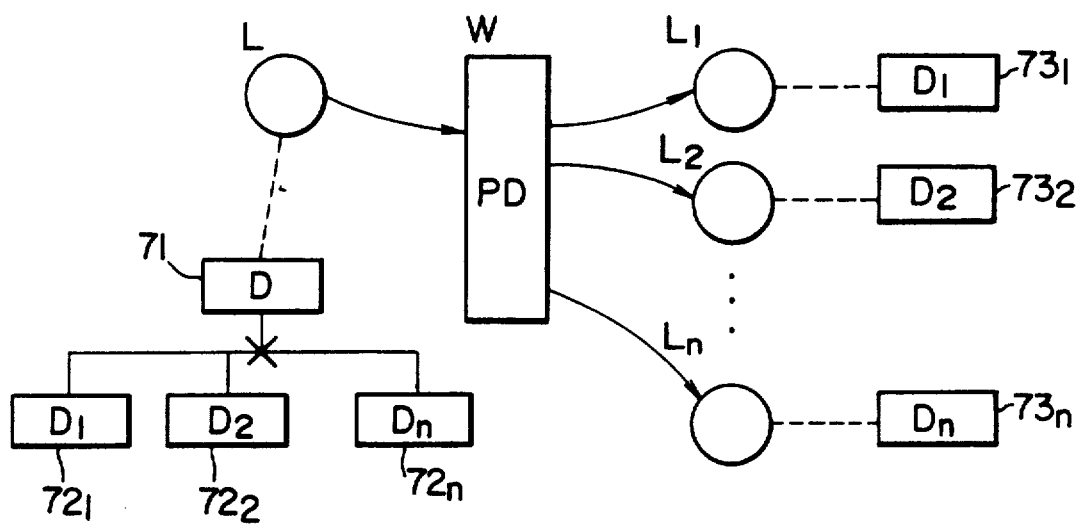
FIGS. 7A and 7B illustrate an operation of data with a Cartesian product structure.

For the Cartesian data structure, there are prepared a product decomposition instruction and a product composition instruction. A general arrangement of Cartesian product decomposition is shown in FIG. 7A. The data structure D 71 at the input side link L of a work node W is a Cartesian product of D1 to Dn $73,-73_n$ respectively, an instruction code assigned to the work node is a product decomposition instruction PD, and the data structure at the output side links L1 to Ln of the work node W are D1 to Dn $73,73_n$ respectively. In this condition, when a value V of D is set at the link L, the work node becomes executable. Upon execution by the work node W, the value V is taken from the link and decomposed into elements V1 to Vn to set them at the output side links L1 to Ln, respectively.

Figure 7B:
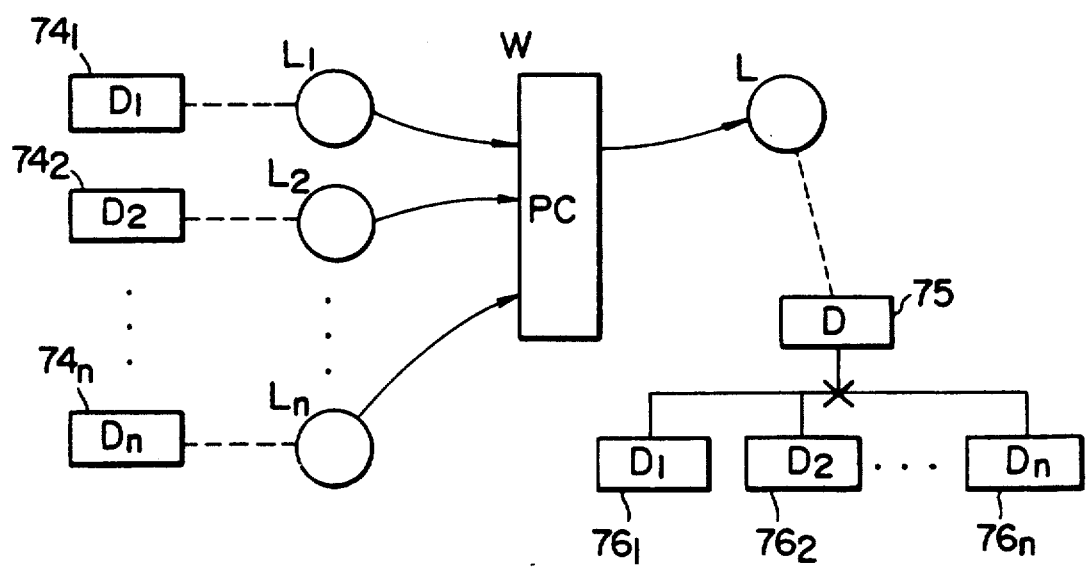

A general arrangement of Cartesian product composition is shown in FIG. 7B. The data structures at the input side links L1 to Ln of a work node W are D1 to Dn $74_1$-$74_n$ respectively, an instruction code assigned to the work node W is a product composition instruction PC, and the data structure D 75 at the output side link L of the work node W is a Cartesian product of D1 to Dn $76_1, 76_n$ respectively. In this state, when values V1 to Vn of the data structures D1 to Dn are set at the links L1 to Ln, the work node W becomes executable. Upon execution by the work node W, the values V1 to Vn are simultaneously picked up to the work node to compose the values V1 to Vn into a value V which is set at the link L.

Figure 8A:
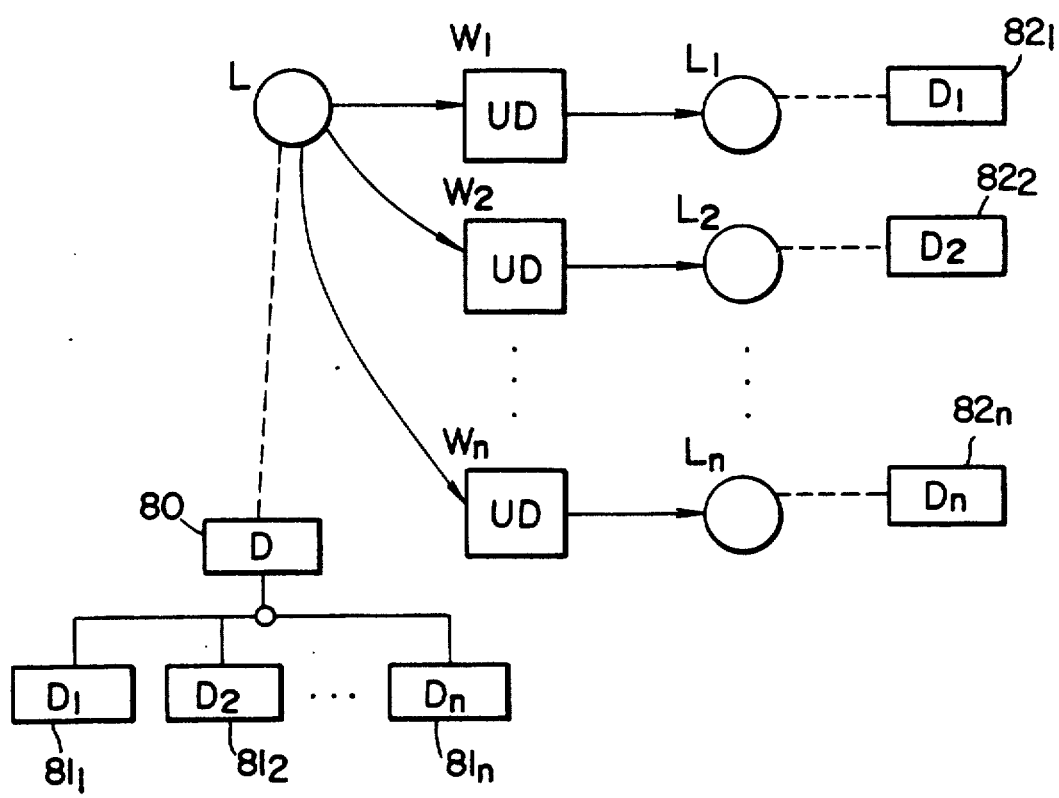
FIGS. 8A and 8B illustrate an operation of data with a direct union structure.
Figure 8B:
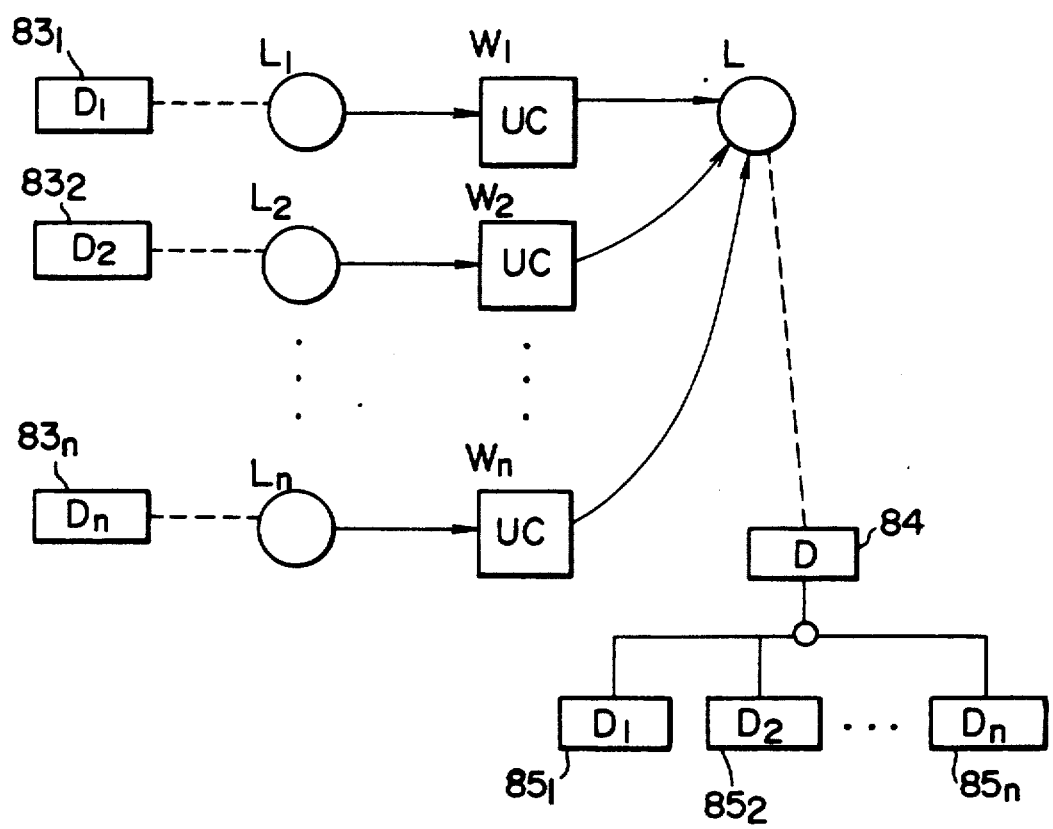

For the direct union structure, there are prepared a union decomposition instruction and a union composition instruction. A general arrangement of direct union decomposition is shown in FIG. 8A. The data structure D 80 at the input side link L of work nodes W1 to Wn is a direct union of D1 to Dn $81_1$-$81_n$ respectively, an instruction code assigned to each work node is a union decomposition instruction UD, and the data structures at the output side links L1 to Ln of the work nodes W1 to Wn are D1 to Dn $81_1$-$82_n$ respectively. In this condition, when a value V of D is set at the link L and the value V belongs to Di (i=1 to n), the work node Wi becomes executable. Upon execution by the work node Wi, the value V is taken from the link and set at the link Li as the element of Di. A general arrangement of direct union composition is shown in FIG. 8B. The data structures D at the input side links L1 to Ln of work nodes W1 to Wn are D1 to Dn $83_1$-$83_n$ respectively, an instruction code assigned to each work node is a direct union composition instruction UC, and the data structure D 84 at the output side link L of the work nodes W1 to Wn is a direct union of D1 to Dn $85_1$-$85_n$ respectively. In this condition, when a value Vi belonging to a link Li among the links L1 to Ln is set, the work node Wi becomes executable. Upon execution by the work node Wi, the value Vi is taken from the link and set at the link L as an element of D 90.

Figure 9A:
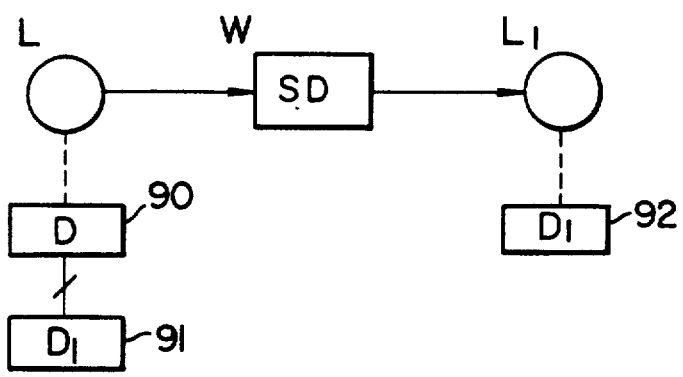
FIGS. 9A and 9B illustrate an operation of data with a sequence structure.
Figure 9B:
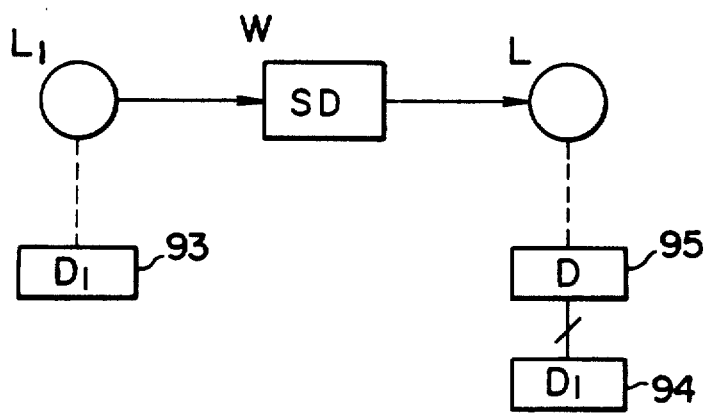

For a sequence data structure, i.e., list, there are prepared a sequence decomposition instruction and a sequence composition instruction. A general arrangement of sequence decomposition is shown in FIG. 9A. The data structure D (e.g., list) at the input side link L of a work node W is a list of D1 91 (e.g., one line of the list), an instruction code assigned to the work node W is a sequence decomposition instruction SD, and the data structure at the output side link L1 is D1 92. In this condition, when a value V of D is set at the link L, the work node W becomes executable. Upon execution by the work node W, the value V is taken from the link and decomposed into sequence structure elements V1 to Vn all of which are set at the link L1 while maintaining this order of elements. A general arrangement of sequence composition is shown in FIG. 9B. The data structure at the input side link L1 of a work node W is D1 93, an instruction code assigned to the work node is a sequence composition instruction SC, and the data structure at the output side link L is a list of D1 94 of D 95. In this condition, when values V1 to Vn (n is 1 or more) of D1 at the link L1 are set, the work node becomes executable. Upon execution by the work node W, the values V1 to Vn are simultaneously picked up to the work node to compose them into an element V of the sequence structure data D and set it at the link L.

Figure 11:
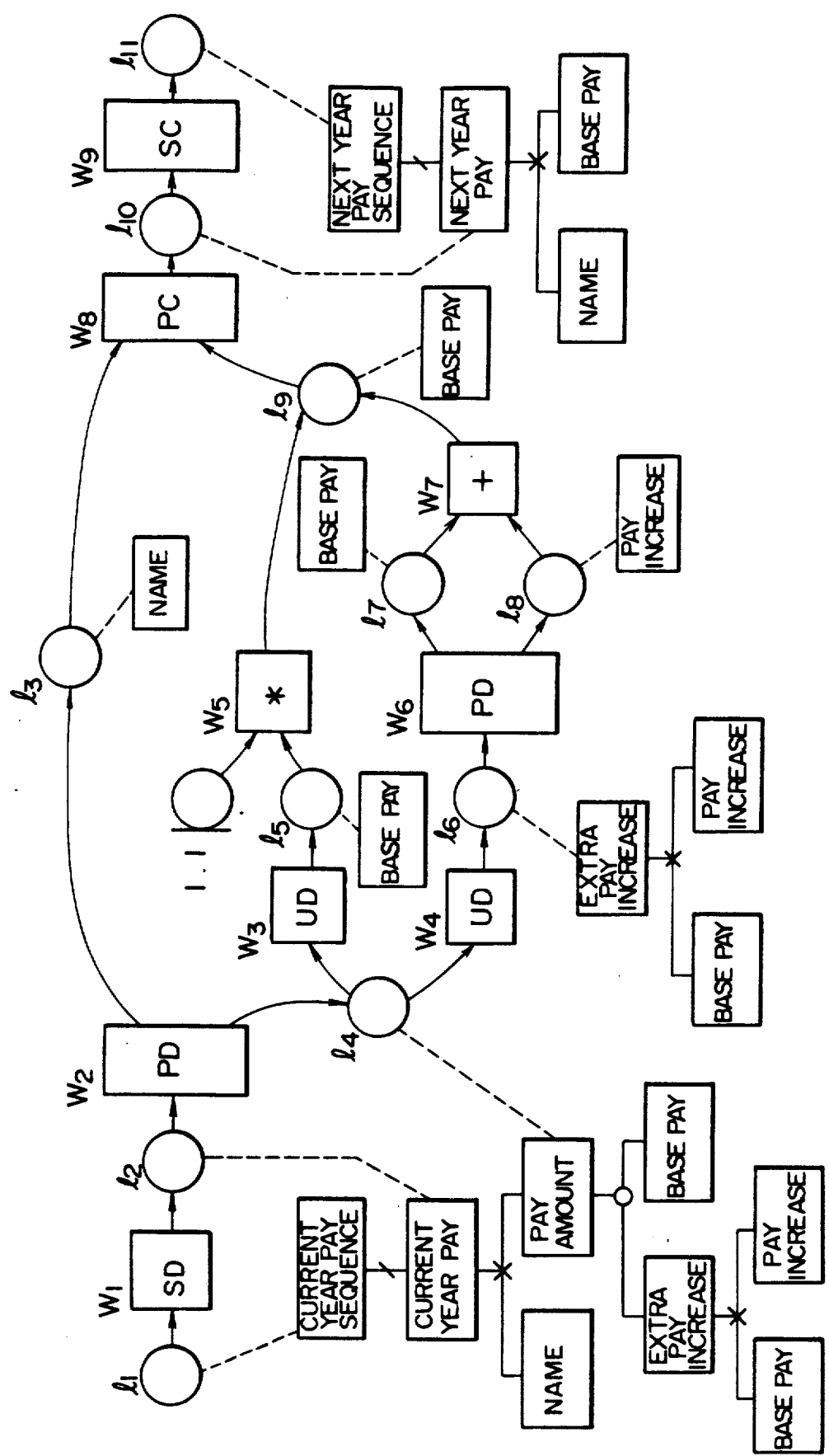
FIG. 11 shows an example of data-flow handling structured data.

The formats of program instructions shown in FIGS. 7A, 7B, FIGS. 8A, 8B and FIGS. 9A, 9B are shown in FIGS. 10A to 10F. An example of data-flow handling such data structures is shown in FIG. 11.

An embodiment of an automatic processing system as one of the applications of the present invention will be described next.

Figure 1:
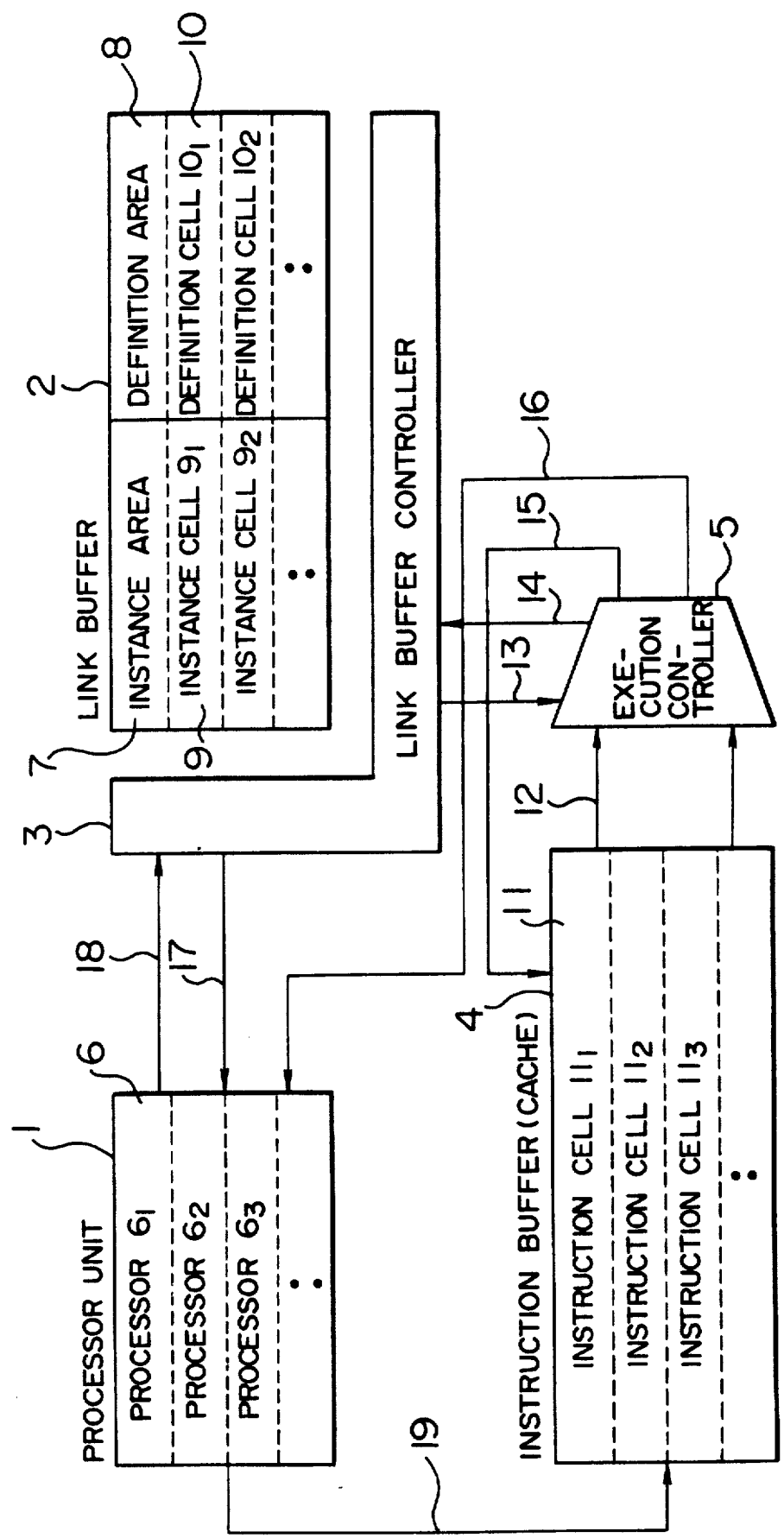
FIG. 1 shows the arrangement of an embodiment of a structured data driven type processor system according to the present invention.

FIG. 1 illustrates a block diagram showing a structured data driven type processor system of the invention by which a data-flow program handling structured data can be executed. The structured data driven type processor system of this embodiment includes a processor unit 1, a link buffer 2, a link buffer controller 3, an instruction buffer 4 and an execution controller 5. The processor unit 1 is comprised of a plurality of processors $6_1, 6_2, 6_3, \ldots$. The link buffer 2 is composed of an instance area 7 and a definition area 8, the former being comprised of a plurality of instance cells $9_1, 9_2, \ldots$ and the latter composed of a plurality of definition cells $10_1, 10_2, \ldots$. The instruction buffer 4 is composed of a plurality of instruction cells $11_1, 11_2, 11_3, \ldots$ Information on program instructions conforming with the instruction format shown in FIG. 3B is stored in the instruction cells $11_1, 11_2, 11_3, \ldots$ of the instruction buffer 4. The information is called on instruction packet in this specification. The format of the instruction packet 1201 is shown in FIG. 12A by way of example. An instruction packet is constructed of an instruction code, link information at the input side, and link information at the output side. How an instruction packet group for the data-flow shown in FIG. 11 is stored in the instruction buffer is shown in FIG. 12B by way of example.

Figure 13A:
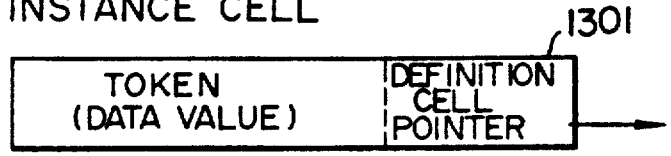
FIGS. 13A and 13B illustrate data arrangement in a link buffer.

Link information of the data-flow program is stored in the instance cells $9_1, 9_2, 9_3, \ldots$ within the instance area 7 of the link buffer 2. Each link is labeled a number to uniquely identify the link. A value stored in a link is associated with the data structure for that link. Such data structure information is stored as a pointer to the definition cell 8. A format of a instance cell 1801 is shown in FIG 13A by way of example.

Figure 13B:
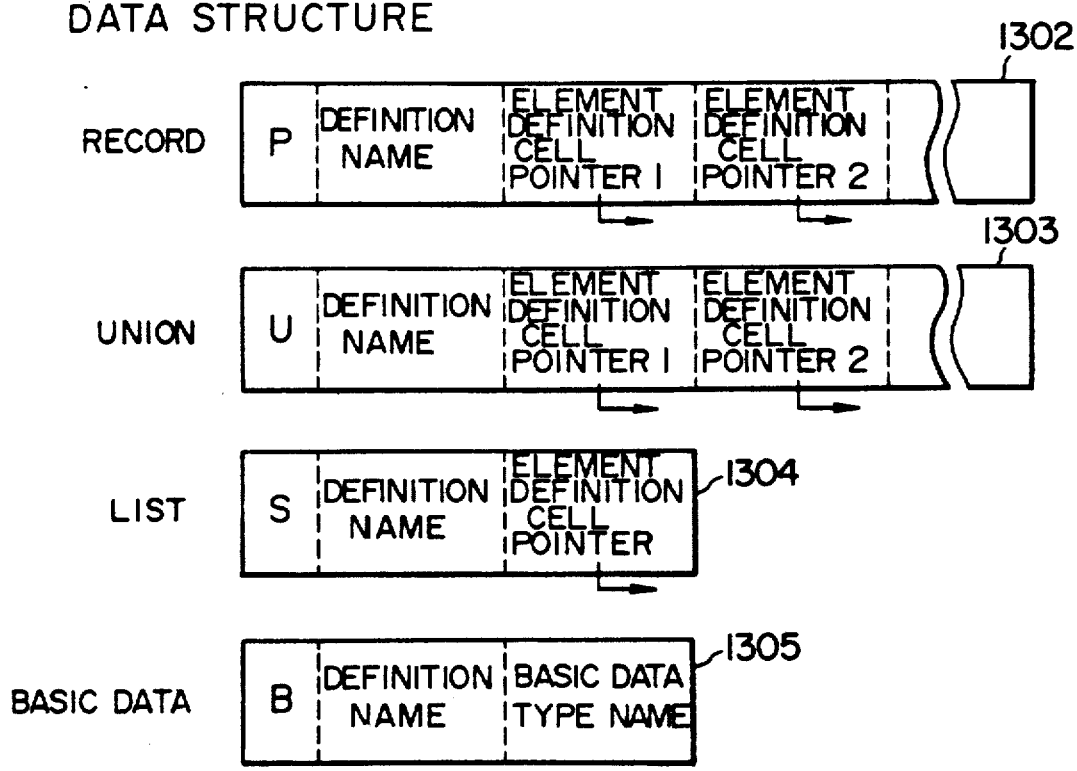
Figure 14:
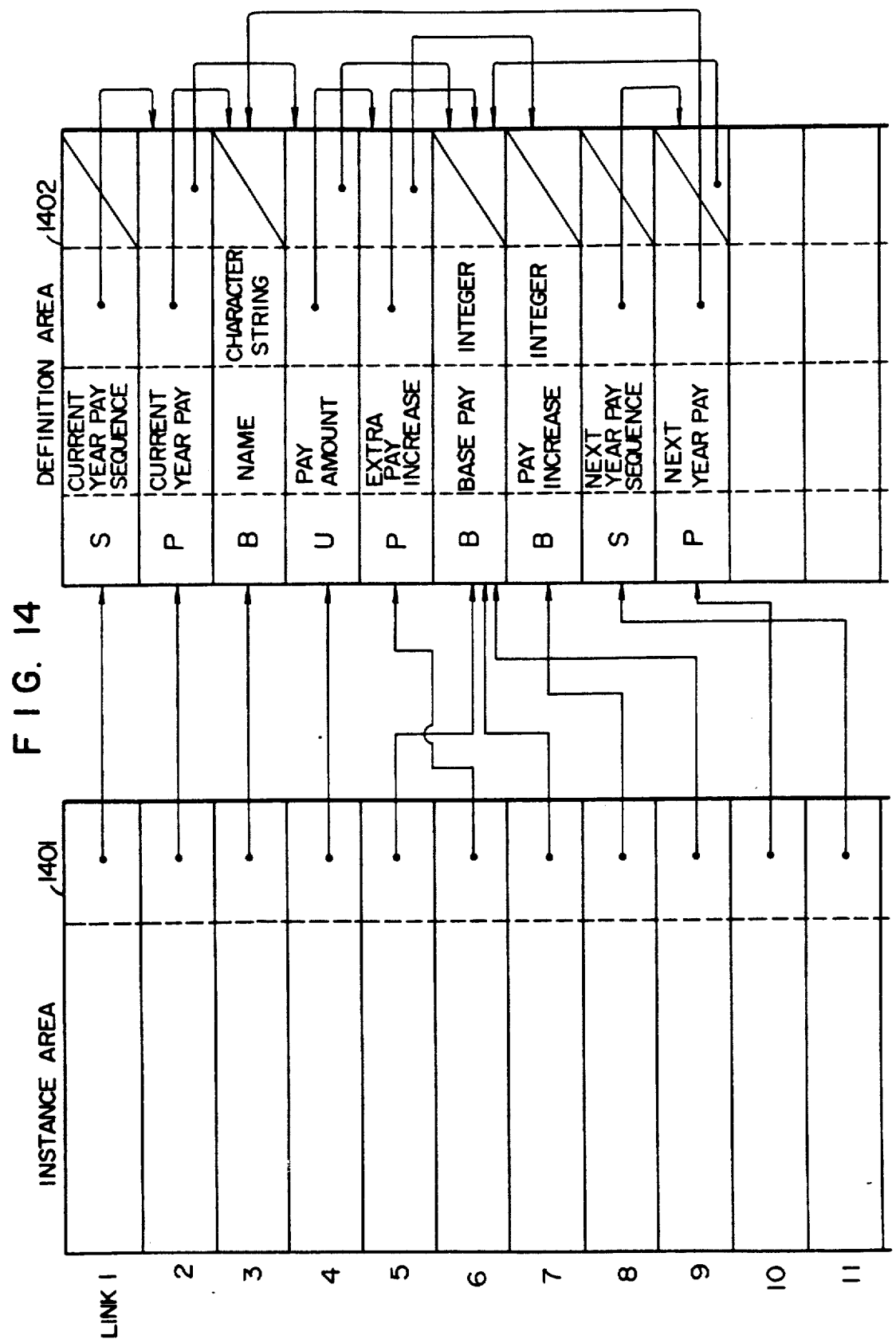
FIG. 14 shows an example of arrangement of the link buffer.

Data structure information is stored in the definition cells $10_1, 10_2, \ldots$ within the definition area 8 of the link buffer 2. Stored in a definition cell 10i (i=1 to n) is structure information of Cartesian product, direct union and sequence shown in FIG. 5 A-5C or basic data type information. FIG. 13B shows examples of the format of structure information 1302-1305 of the definition cells $10_1, 10_2, \ldots$ An example of the format of the link buffer 2 for the data-flow shown in FIG. 11 is shown in FIG. 14 as instance area 1401 and definition area 1402.

Figure 15:
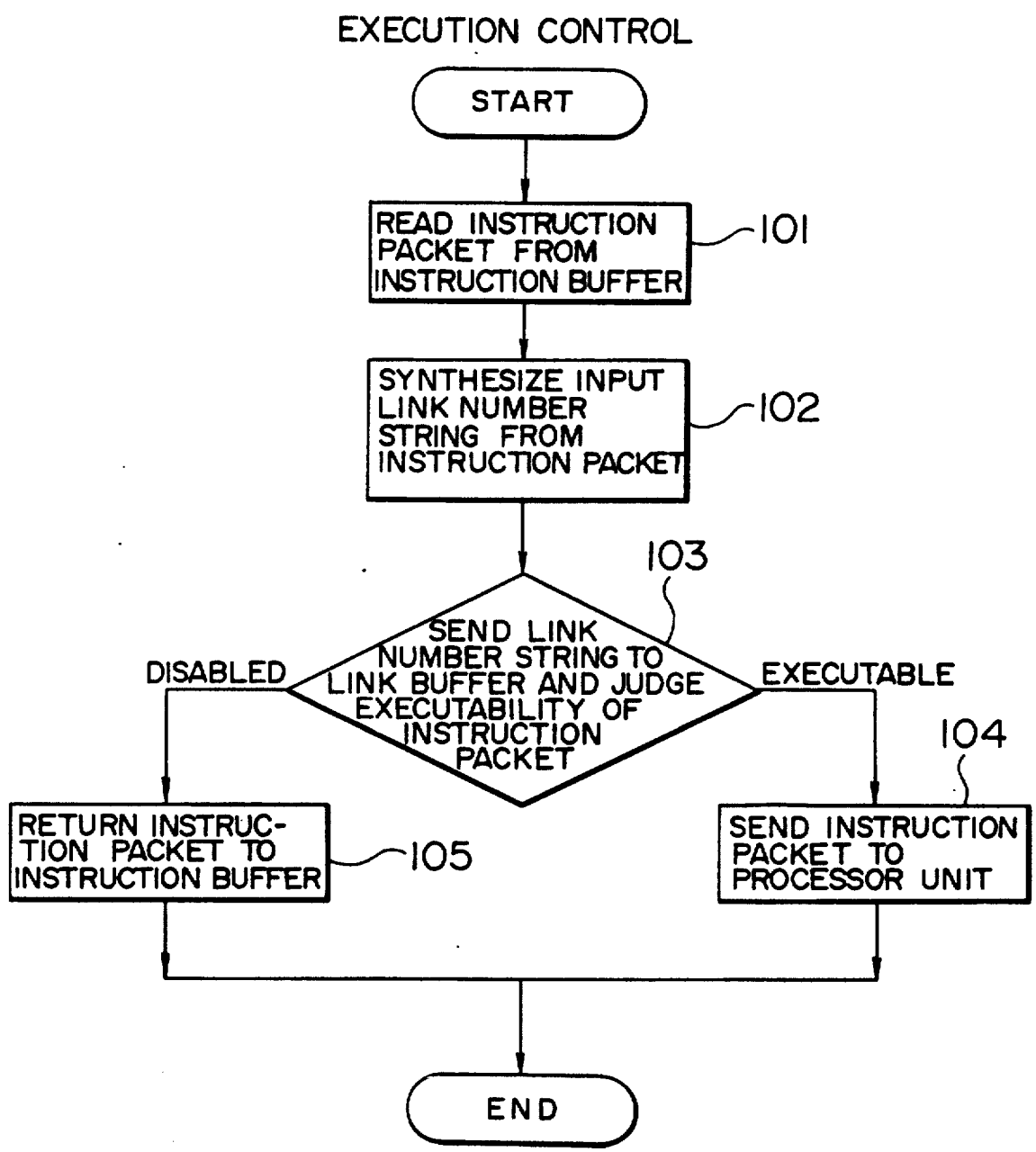
FIG. 15 is a flow chart illustrating processes executed by an execution controller.

FIG. 15 shows a flow chart illustrating an execution procedure of the execution controller 5 shown in FIG. 1. In operation of the execution controller 5, an instruction packet signal 12 is received (step 101) from the instruction buffer 4 to collect input operands of the instruction packet and generate an input link number string (step 102). Next, in order to judge if the state that an instruction becomes executable only when values at all the input links concerned have been set, is met or not, the input link number string signal 14 is sent to the link buffer controller 3 and the resultant judgment signal 13 is received (step 103). It should be understood that if an input link having only a single data value (token) is connected to a plurality of work nodes and the token is picked up by one of the work nodes, then the other work nodes enter into a disable state and are not executed with the packet being returned to the instruction buffer.

If the judgment signal 13 indicates an executable state, the instruction packet signal 16 is sent to the processor unit 1 (step 104). If not, the instruction packet signal 15 is returned to the instruction buffer 4 (step 105). The above processes can be executed in parallel for each instruction cell 11 to thus improve the operating performance.

Figure 16:
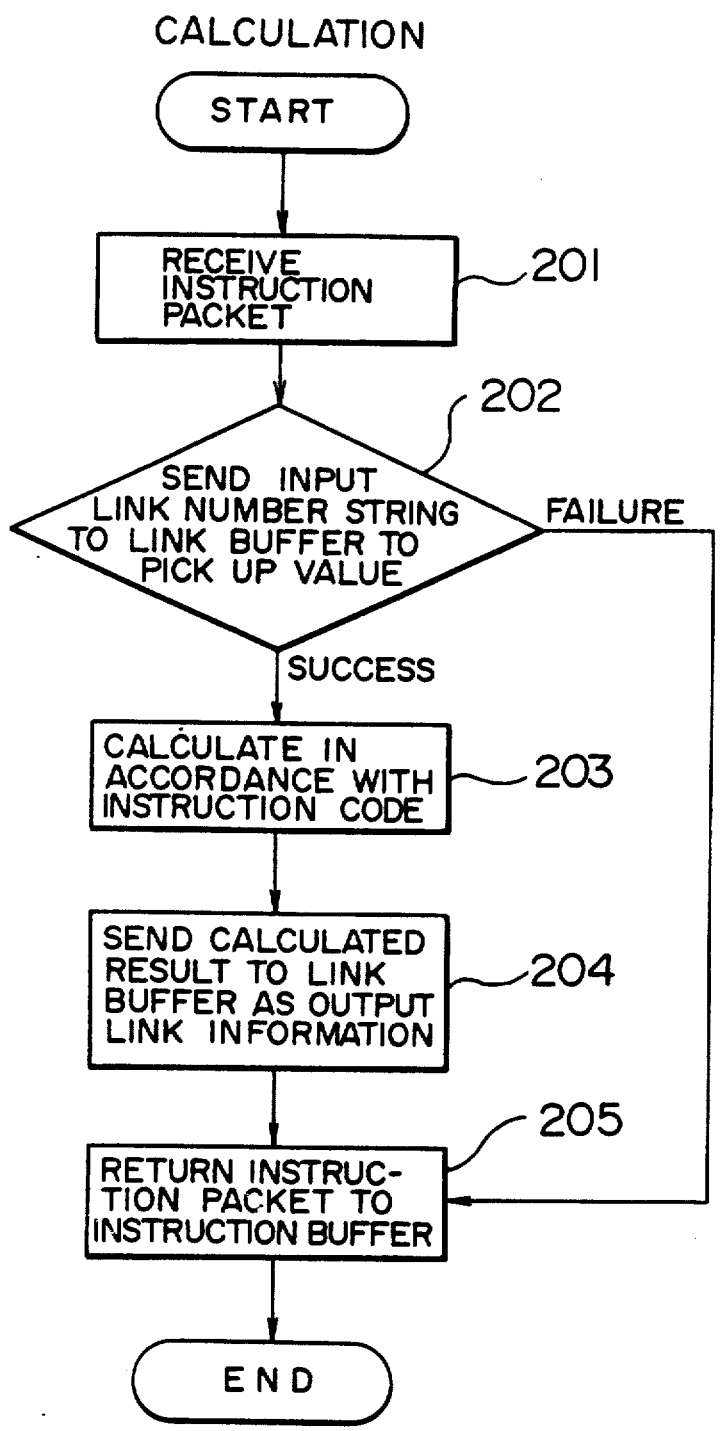
FIG. 16 is a flow chart illustrating processes executed by a processor unit.

FIG. 16 shows a flow chart showing the execution procedure of the processor unit 1 shown in FIG. 1. The processor unit 1 is comprised of a plurality of processors $6_1, 6_2, 6_3, \ldots$ so that a plurality of instruction packets can be processed in parallel.

The operation of the processor unit 1 is as in the following. When the processor unit 1 receives an instruction packet signal 16 from the execution controller 5 (step 201), it assigns an idle processor to the execution of the instruction packet. After deriving input link numbers from the received instruction packet, a link number string signal 18 is sent to the link buffer controller to obtain values stored in the associated links, and a resultant link data string signal 17 is received (step 202). In the case of a failure of obtaining the link data, the instruction packet is returned to the instruction buffer without executing it (step 205).

In the case of a success of obtaining the link data, based on the obtained values, a calculation is performed in accordance with the instruction code of the instruction packet (203). The resultant calculated data string is sent to the link buffer controller 3 as the output link data string signal 18 (step 204). After the calculation, the instruction packet signal 19 is sent to the instruction buffer 4 (step 205).

Figure 17A:
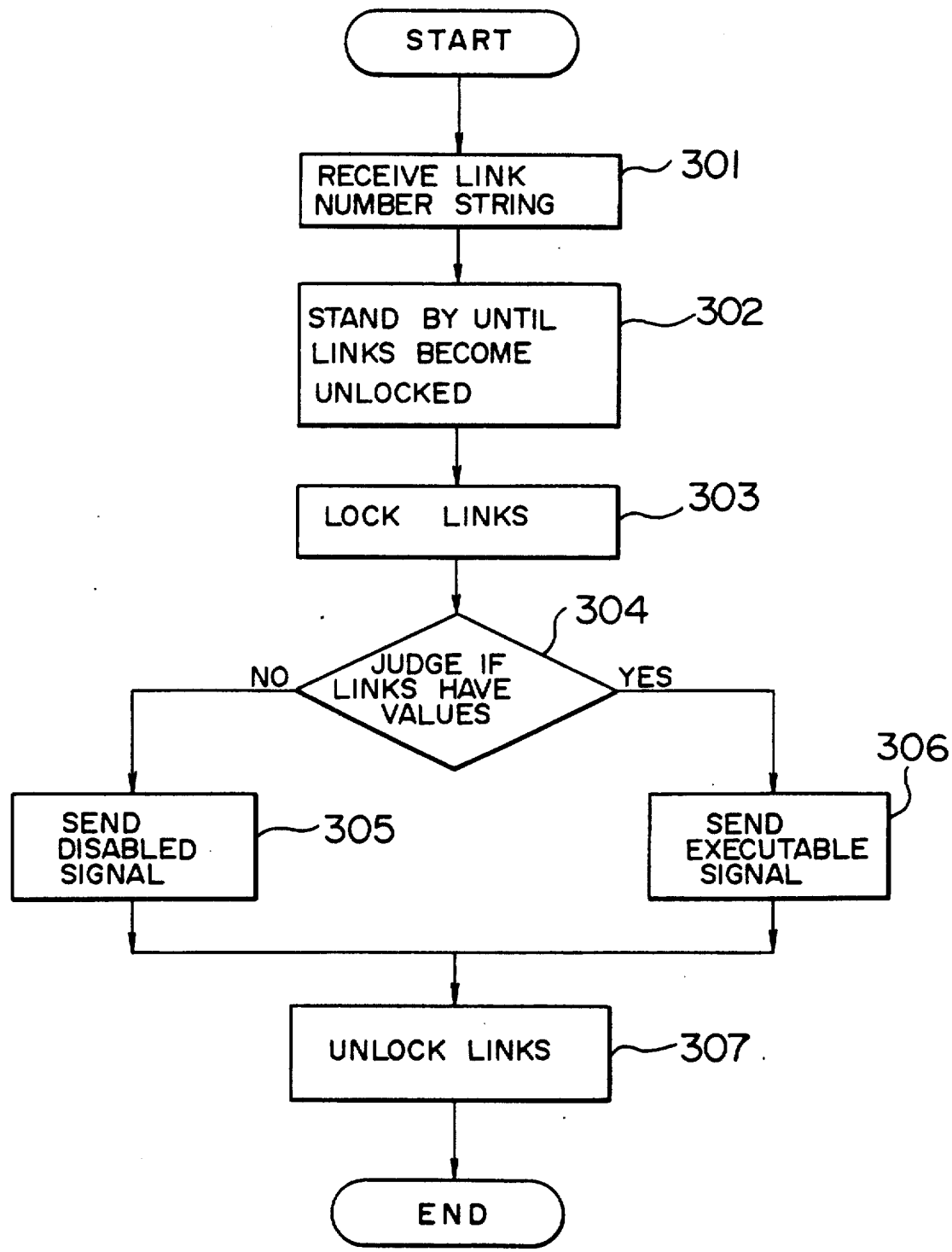

FIGS. 17A and 17C show flow charts illustrating the execution procedures of the link buffer controller 3 shown in FIG. 1 the link buffer controller 3 is used for performing an exclusive control of accesses to the link information of a data-flow program in accordance with a priority order. The procedures in accessing the link information include an execution judgment by the execution controller 5, a data acquisition and a data setting by the processor unit 1, all of which can be executed in parallel.

The operation of the processor unit 1 is as in the following.

FIG. 17A shows a flow chart illustrating the procedure of the execution judgment. When the link buffer controller 6 receives an input link number string signal 16 from the execution controller 5 (step 301), it stands by until all the links included in the link number string becomes unlock state (step 302), locks all the links to perform an exclusive control of link accesses from other processes (step 303), and judges if a value is set at each link (step 304).

If all the links have set values, a judgment signal 13 indicative of executable state is sent to the execution controller 5 (step 306). If even one of the links has not a set value, a judgment signal 13 indicative of disable state is sent to the execution controller 5 (step 305). Lastly, the lock state of the links is released (step 307).

Figure 17B:
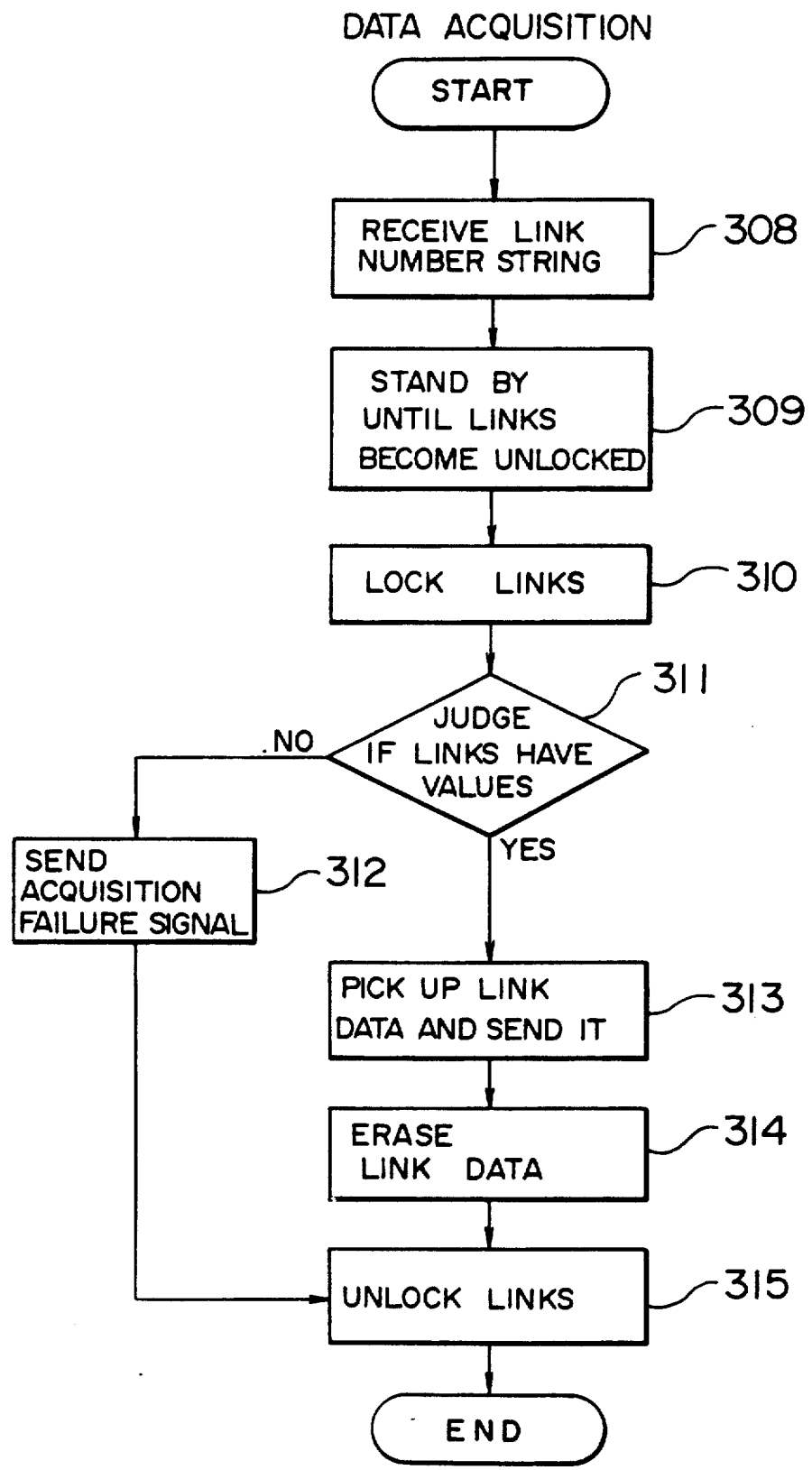

FIG. 17B shows a flow chart illustrating the procedure of data acquisition. When the link buffer controller 3 receives a link number string signal 18 from the processor unit 1, it stands by until all the links included in the link number string becomes unlock state (step 309), locks all the links to perform an exclusive control of link accesses from other processes (step 310), and judges if a value is set at each link (311).

If even one of the links has not a set value, a control signal 17 indicative of a failure of data acquisition is sent to the processor unit 1 (step 312). If all the links have set values, the link data are taken therefrom and the associated link data string signal 17 is sent to the processor unit 8 (step 313) to thereafter erase the taken data from the link (step 314). Lastly, in a similar manner to the above, the lock state of all the links is released (step 315).

FIG. 17C shows a flow chart illustrating the procedure of data setting. When the link buffer controller 3 receives a resultant calculated output link data string signal 18 from the processor unit 1 (step 316), it stands by until all the links included in the output link data string signal 18 from the link buffer become unlock state (step 317), locks all the links to perform an exclusive control of link accesses from other processes (step 318), and sets data designated by the output link data string signal 18 at each link (step 319). Lastly, the lock state of all the links is released (step 320).

According to the structured data driven type processor system described in the above embodiments, not only conventional basic data can be processed, but also structured data having records, unions and lists can be directly processed. Therefore, a data-flow program which is more abstract and more easy to be understood by human can be developed, and the reliability of a program can be improved due to its easy understanding. Further, an operation handling structured data is introduced which operation can be performed in the similar manner as of other calculations. Therefore, parallel execution is ensured to thus improve the execution speed of a program.

In the above embodiments, structured data driven type processor systems embodying the present invention have been described by way of example. However, it is obvious to those skilled in the art that the invention is not limited to structured data driven type processor systems, but it is also applicable to Von-Neumann type processor systems.

I claim:

1. A structured data processor system comprising:
   a plurality of processors for executing instruction;
   an instructions buffer for holding instructions in executing a data-flow program;
   execution control means for judging whether instructions, from said instruction buffer to be executed by said plurality of processors, are executable and sending said instructions to said plurality of processors if judged to be executable;
   means for interconnecting said execution control means, said instruction buffer and said plurality of processors;
   wherein instructions having a complete set of operand data can be executed in parallel in said plurality of processors; and
   wherein said instruction buffer includes an area for storing information on a decomposition instruction and a composition instruction to be executed by said plurality of processors, wherein when said decomposition instruction is executed by said plurality of processors, structured data being inputted to said plurality of processors is decomposed into constituent elements, said structured data being of at least one of Cartesian product data, direct union data and sequence data, or data convertible into such structured data, and wherein when said composition instruction is executed by said plurality of processors, constituent elements being inputted to said plurality of processors is composed into structured data being of at least one of Cartesian product data, direct union data or sequence data;

a link buffer for storing link information on links included in a data-flow program diagram and having operands of said instruction;

and link buffer control means connected to said link buffer for performing an exclusive control of said link information;

wherein said link buffer control means cooperates with said execution control means to send said link information of said link buffer to said plurality of processors in accordance with instructions from said instruction buffer.

2. A system according to claim 1, wherein said link buffer includes an area for storing link information of a data-flow program and an area for storing information on a data structure corresponding to said stored link information, and said instruction buffer stores information having an instruction format of said data-flow program as an instruction packet.

3. A system according to claim 2, wherein said instruction packet includes an instruction code defining a work node, and link information for input and output sides of said work node.

* * * * *